United States Patent
Rackley et al.

(10) Patent No.: US 10,872,301 B2
(45) Date of Patent: Dec. 22, 2020

(54) SYSTEM AND METHOD FOR ALLOCATING VEHICLES ACROSS A POOL OF CUSTOMERS IN A SUBSCRIPTION VEHICLE SERVICE

(71) Applicant: CLUTCH TECHNOLOGIES, LLC, Atlanta, GA (US)

(72) Inventors: Brady L. Rackley, Atlanta, GA (US); John R Phelps, Atlanta, GA (US); Adam J. Carley, Atlanta, GA (US); Vincent G. Zappa, Atlanta, GA (US); Steven S. Neel, Atlanta, GA (US); Sangameswar Venkatraman, Atlanta, GA (US); James F. Heller, Atlanta, GA (US); Ashish Trehan, Atlanta, GA (US); Christopher M. L. Howie, Atlanta, GA (US); Frank L. Wilson, IV, Atlanta, GA (US); Kyle L. Clements, Atlanta, GA (US)

(73) Assignee: Clutch Technologies, LLC, Atlanta, GA (US)

( * ) Notice: Subject to any disclaimer, the term of this patent is extended or adjusted under 35 U.S.C. 154(b) by 197 days.

(21) Appl. No.: 15/267,148

(22) Filed: Sep. 16, 2016

(65) Prior Publication Data
US 2017/0068917 A1    Mar. 9, 2017

Related U.S. Application Data

(63) Continuation-in-part of application No. 14/847,881, filed on Sep. 8, 2015, now abandoned.

(Continued)

(51) Int. Cl.
*G06Q 10/06* (2012.01)
*G06N 5/00* (2006.01)

(52) U.S. Cl.
CPC ....... *G06Q 10/06313* (2013.01); *G06N 5/003* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 6,317,720 B1 * | 11/2001 | Murakami | G06Q 10/02 705/13 |
| 6,374,227 B1 * | 4/2002 | Ye | G06Q 10/04 705/7.25 |

(Continued)

OTHER PUBLICATIONS

A Fair Assignment Algorithm for Multiple Preference Queues, Leong Hou et al., VLDB '09, (Year: 2009).*

(Continued)

*Primary Examiner* — Dennis W Ruhl
(74) *Attorney, Agent, or Firm* — Smith Tempel Blaha LLC; Gregory Scott Smith

(57) ABSTRACT

Optimizing the assignment of vehicles in a fleet across a pool of customers. Identifying a pool of customers to be included in an assignment event and identifying available vehicles. Cull the domain of potential assignment scenarios by filtering out undesired matches. Score the generated scenarios based on various desired factors and then rank the scenarios. Select one or more optimal scenarios and analyze for week spots. Bolster the week spots by interacting with one or more customers to identify alternate solutions. Select and implement the optimal scenario.

12 Claims, 3 Drawing Sheets

Related U.S. Application Data

(60) Provisional application No. 62/046,813, filed on Sep. 5, 2014.

(56) References Cited

U.S. PATENT DOCUMENTS

| | | | | |
|---|---|---|---|---|
| 6,941,197 B1* | 9/2005 | Murakami | .......... | B60L 11/1816 |
| | | | | 320/109 |
| 6,947,881 B1* | 9/2005 | Murakami | .......... | B60L 11/1816 |
| | | | | 701/1 |
| 6,975,997 B1* | 12/2005 | Murakami | .......... | B60L 11/1824 |
| | | | | 705/5 |
| 7,181,409 B1* | 2/2007 | Murakami | .......... | B60L 11/1816 |
| | | | | 705/5 |
| 2004/0093286 A1* | 5/2004 | Cooper | ................ | G06Q 10/087 |
| | | | | 705/28 |
| 2007/0168307 A1* | 7/2007 | Floudas | ................ | G06Q 10/00 |
| | | | | 706/19 |
| 2008/0059056 A1* | 3/2008 | Chavira | ................ | G01C 21/00 |
| | | | | 701/410 |
| 2008/0109255 A1* | 5/2008 | Allen | ................ | G06Q 10/10 |
| | | | | 705/2 |
| 2012/0059686 A1* | 3/2012 | Williams | ......... | G06Q 10/06375 |
| | | | | 705/7.37 |
| 2013/0046526 A1* | 2/2013 | Yucel | ................ | G01C 21/3469 |
| | | | | 703/8 |

OTHER PUBLICATIONS

Identify algorithm for my resource allocation needs, softgware engineering stack exchange, (Year: 2014).*

* cited by examiner

SYSTEM AND METHOD FOR ALLOCATING VEHICLES ACROSS A POOL OF CUSTOMERS IN A SUBSCRIPTION VEHICLE SERVICE

CROSS-REFERENCE TO RELATED APPLICATIONS

This application is a continuation-in-part of U.S. application Ser. No. 14/847,881 filed on 2015 Sep. 8, which application is incorporated herein in its entirety and is also related to and is being filed concurrently with the following United States applications for patent, each of which are herein incorporated by reference in their entirety:

SYSTEM AND METHOD FOR SCORING THE FIT OF A VEHICLE FOR A GIVEN FLIP REQUEST, filed on Sep. 16, 2016 and assigned Ser. No. 15/267,144, LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS, filed on Sep. 16, 2016 and assigned Ser. No. 15/267,150.

LEARNING AGENT THAT FACILITATES THE EXECUTION OF A SUBSCRIPTION VEHICLE SERVICE BY IDENTIFYING VEHICLE SUGGESTIONS OR SUGGESTIONS THAT A CUSTOMER SWAP BASED ON DYNAMICALLY GATHERED INFORMATION, filed on Sep. 16, 2016 and assigned Ser. No. 15/267,145.

BACKGROUND

The parent application to this disclosure addresses a need in the art for a system and a method of controlling risks, administering assets, scheduling operations, and providing highly personalized customer service for a service offering subscription vehicle access. As one of ordinary skill in the art would expect, a provider of a subscription vehicle service, as well as a client to a subscription vehicle service, may have a need for an artificially intelligent capability for identifying vehicle suggestions for customers. Related applications to this disclosure focus on generating optimal vehicle suggestions for an entity based on dynamically obtaining and evaluating information pertaining to that entity. Another related application focuses on the techniques utilized to dynamically obtain such information. However, in a subscription vehicle service, it should be understood that there is a need in the art to optimize the assignment of vehicles across a pool of multiple users.

The successful management of a subscription based vehicle service necessitates the efficient utilization of vehicle assets in order to optimize across a variety of business objectives. However, managing a vehicle fleet to maximize the user experience is a dynamic and complex problem in terms of vehicle availability, user preference, labor availability and other factors. The successful optimization of these resources and competing interests based on a broad, dynamic range of variables clearly affects customer experience, the ability to deliver goods and services, and the assignee's financial position. Vehicle fleet optimization thus is an important factor in successfully operating a subscription based vehicle service as it affects a company's ability to grow revenue and be more profitable.

With a subscription vehicle service, a customer is one who pays to have access to any one or more of a plurality of vehicles at any given time. Access to more than one vehicle requires the assignee to maintain a pool of vehicles in anticipation of a customer's need. Maintaining this vehicle fleet is costly and therefore minimization of the vehicle fleet size while maximizing the customer experience is a desired objective. Thus, it is desirable to have methodologies that integrate and exploit past and future customer need patterns, as well as vehicle and labor availability, in order to optimize the allocation of vehicles. Thus, there is a need in the art for a system and method that address these shortcomings.

SUMMARY OF THE DISCLOSURE

Various embodiments of methods and systems for optimizing the assignment of vehicles to a pool of customers are presented. Optimizing the assignment of vehicles in a fleet across a pool of customers is accomplished by first identifying a pool of customers to be included in an assignment event and identifying available vehicles or vehicles that are anticipated to become available for the event. The domain of potential assignment scenarios is culled by filtering out undesired matches based on various factors such as expected low customer satisfaction, cost, complexities of flips, etc. The generated scenarios are then scored based on various desired factors and then, based on the values for the one or more factors, the scenarios are ranked. One or more optimal scenarios are then selected and analyzed for weak spots or areas of potential improvement. The scenarios are optimized by bolstering the weak spots through various means, including interacting with one or more customers to identify alternate solutions. Finally, an optimum scenario is selected and implemented.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

Figure 1:
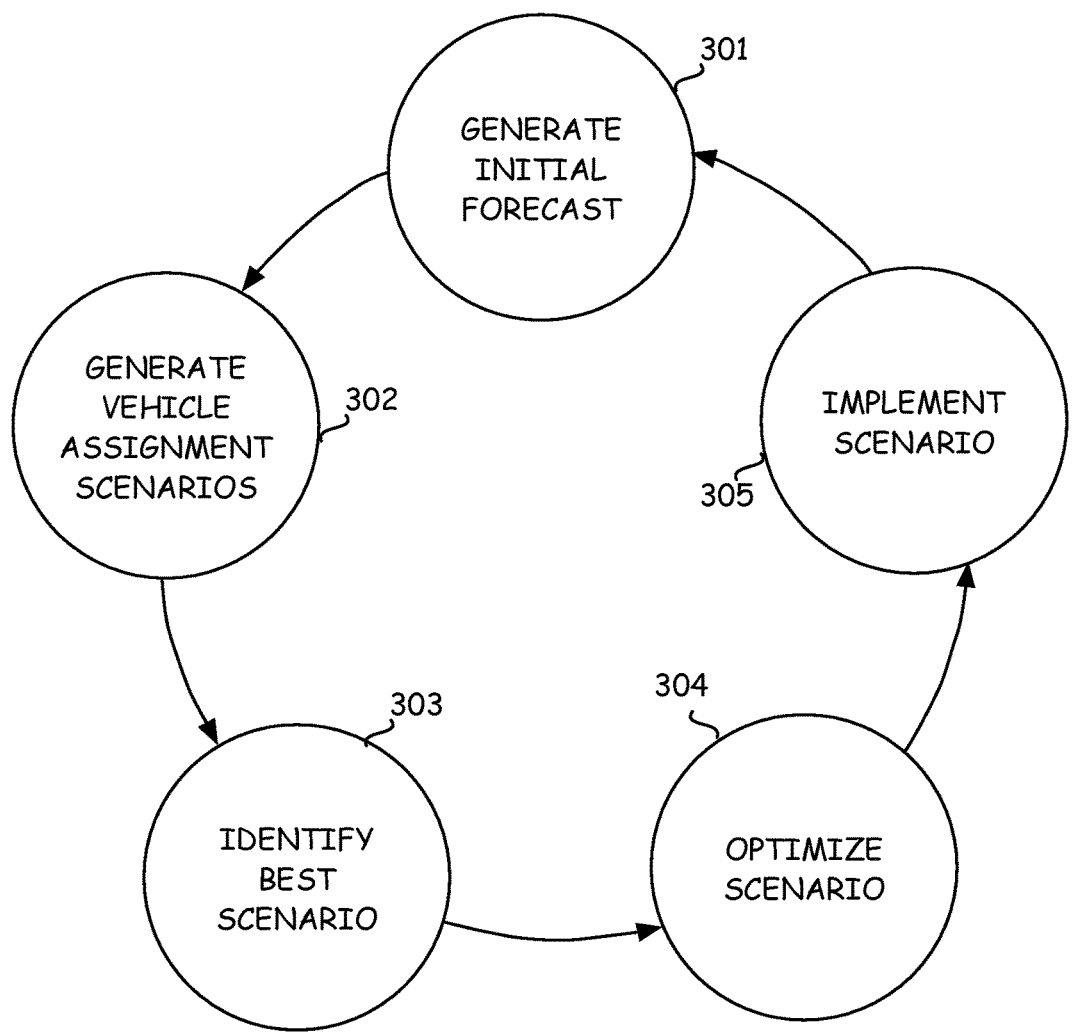
FIG. 1 is a high-level flow diagram illustrating an exemplary process for the dynamic information based subscription vehicle service ("SVS").

The present disclosure, which should be viewed with reference to the above-incorporated parent and related applications, generally relates to a system for and a method of iteratively and dynamically attempting to maintain an optimized assignment of vehicles that are selected from a fixed fleet and are assigned across a pool of multiple customers.

The present disclosure presents embodiments, as well as features, aspects and functionality that can be incorporated into the various embodiments, of an automated system and method to generate vehicle assignment scenarios based on various inputs, algorithms, parameters, heuristics, etc., identify gaps in vehicle assignments and suggest user interactions/incentives to facilitate the movement of vehicles across a pool of users.

It should be understood that in the ideal scenario, a totally optimized assignment would result in every vehicle within a fleet being assigned to a customer and that each customer will have maximum satisfaction with the vehicle assignment. Further, any future flips of the vehicles would ideally occur when the vehicles to be flipped are co-located and the resulting customer satisfaction would again me maximized. Obviously, attaining such a scenario would be substantially unlikely even for a single moment in time, and much less likely to be an ongoing state. And thus, the present disclosure focuses on a set of rules, heuristics, algorithms and procedures that can be implemented in a system and method to attempt to optimize vehicle assignments across a pool of customers.

Thus, the present disclosure generally relates to a system and method to optimize the assignment of vehicles in a fleet across a pool of one or more users, to maximize user experience, minimize vehicle fleet size, maximize revenue and/or minimize the cost in the field of consumer transportation. More particularly, the present disclosure relates to a system and method that considers dynamic variables including, but not limited to: the geographic market, labor availability, vehicle availability, user preferences, user propensity to change vehicle, etc.

Definitions

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" or "user" is a named person who has entered into a contract for service and is listed on the account. A "driver" or "named driver" is a person who has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time when a vehicle is assigned to a subscriber or client and is in the custodianship of that subscriber or client. This concept is distinct from "rental" for at least the reason that when a vehicle is rented, the amount paid is a function of the time that the subscriber has the car. Under a subscription service, the payment may comprise a flat fee that does not depend on either the duration of possessions or the frequency of vehicle asset swaps.

> U.S. application Ser. No. 15/267,145, having the title of LEARNING AGENT THAT FACILITATES THE EXECUTION OF A SUBSCRIPTION VEHICLE SERVICE BY IDENTIFYING VEHICLE SUGGESTIONS OR SUGGESTIONS THAT A CUSTOMER SWAP BASED ON DYNAMICALLY GATHERED INFORMATION presents details of a system that generates one or more vehicle suggestions for a customer. The vehicle suggestions can be presented "as is" to a customer or the system may use the suggestions as input for generating optimized vehicle assignment scenarios as presented herein. As such, the details of this process are not covered in this disclosure but, rather, are incorporated by reference above and the reader is directed to such disclosure as support information.

However, in general, a subscription vehicle service system ("SVS") operates to receive customer input and generate suggested vehicle assignments based at least in part on the customer input. When a new customer subscribes to the subscription vehicle service, the new customer may be presented with a set of questions about a variety of topics, such as, but not limited to, their household demographics, lifestyle, personality characteristics (likes, dislikes and elements to which they are indifferent), driving characteristics, vehicle requirements, commuting demographics (daily, monthly, annually etc.), storage requirements (garage size, parking deck restrictions) and income ranges as a few non-limiting examples. The SVS receives the information from the customer and populates a profile that houses the information about the account and the users that are associated with the account. The SVS may then operate to generate a vehicle suggestion list and or obtain further information from and/or about the customer prior to generating such list. However, some event or scheduling ultimately results in creating or indicating that there is a need for either a new customer to obtain a vehicle or an existing customer to flip or return a vehicle and in response, the SVS generates a vehicle suggest list pertaining to the customer.

FIG. 1 is a state diagram illustrating the operation of an exemplary embodiment of an optimized vehicle assignment generator. It should be appreciated that while the various embodiments are described herein as incorporating particular logic, functionality, heuristics, algorithms, rules, etc., that the various embodiments are not limited to the particular logic, functionality, heuristics, algorithms, rules, etc. described and, embodiments do not require each and everyone of the described particular logic, functionality, heuristics, algorithms, rules, etc. Thus, it should be appreciated that while the overall inventive concept is that of dynamically creating and optimizing of fleet vehicle assignments across a pool of customers, various specific implementations are provided to materialize physical embodiments and implementations of the inventive concept.

The illustrated state diagram is an iterative and continuous transitioning model but, for illustrative purposes, the description begins with state 301: GENERATE INITIAL FORECAST. Transition or activation of this state may occur at any time additional information may be available for identifying or indicating a potential flip in vehicle possession, such as a customer entering a flip request, a vehicle being added to or removed from the fleet or simply periodically without any customer prompting whatsoever. It should be appreciated that the states presented in FIG. 1, although they are described as discreet transitions from one state to the next, may actually co-exist with each other in some embodiments and multiple instances of certain states may exist as separate threads. For instance, while one assignment scenario is being implemented, forecasting for a next assignment may already be in process. The overall goal of generating the initial forecast is to identify customers that have requested a flip, potentially will want to flip or are anticipated to desire a flip, that have vehicles that are desired to be brought back into the fleet for maintenance or redirection, or simply a more optimal assignment is available (such as a vehicle is returned to the fleet that is more suitable for a particular customer, the fleet has been expanded, etc.).

The initial forecast may thus identify various customers that desire a flip or may be persuaded to flip due to a system need, and estimated or anticipated flips based on extrinsic data, such as customer schedules, habits, etc. In addition, the initial forecast may also take into consideration currently scheduled vehicle assignments that are associated with the flipping activity identified. Further, the initial forecast may include the identity of vehicles that require maintenance or that optionally can be returned for maintenance, as well as vehicles that are being introduced or removed from the fleet. Thus, in an exemplary embodiment, the initial forecast may identify a list of customers that will or may participate in a flip and a list of available vehicles. The forecast may include any of a variety of details. For instance, in one embodiment, each customer may simply be identified. In another embodiment, each customer may be classified as a requesting or a solicited customer, with the former indicating that the customer has requested a flip and the latter indicating that the customer may be approached to participate in a flip. Customers may be solicited for a variety of reasons. A few non-limiting examples include (a) a customer that currently is in possession of a highly requested vehicle, (b) a customer that has been in possession of a vehicle for a threshold period of time, (c) a customer that has a vehicle that has been specifically requested, (d) a customer that appears to be using a vehicle in a manner that would be better suited with a different vehicle (i.e., travelling frequently for long distances without passengers could prompt a change from a minivan to an economy car), (e) a customer that is going on a family vacation in the near future, (f) vehicle telematics data indicating that the detected use is not optimal for the identified vehicle, (g) a customer that currently is in possession of a vehicle that would be a perfect match based on another customer's request, etc.

In some embodiments each of the identified customers may be identified by a percentage or weighting assignment that indicates that the customer is likely to be willing to be approached for a swap, or that indicates that the satisfaction index for the customer could be easily increased by a different vehicle, etc. Thus, in such embodiments, the initial forecast could include customers that are seeking a flip and then a ranking of customers that can be approached in an effort to optimize the overall exchange of vehicles. As an illustrative example, suppose Customer A has entered a request for a particular class of vehicle. If no other customers that possess that class of vehicle are seeking a flip and the current fleet inventory does not include such a vehicle, the SVS may then look to customers that are in possession of that class of vehicle and that could be approached for a solicited flip. As another example, Customer B may have been delivered a vehicle that had a good level of satisfaction but, was not exactly what Customer B was looking for. If Customer C is in possession of such vehicle and indicates he/she wants a flip, then Customer B could be brought into the forecast as a potential flip target.

Thus, a forecast may include currently scheduled flips, predicted flips based on user information and prior experience, scheduled information including time, date and location of vehicles, as well as current assignments and time remaining for each assignment, and indications of customer satisfaction with previous flips and current vehicles based on a priori information as well as a posteriori information and required or optional maintenance and service for vehicles, lease expirations and rental agreement terms.

In state 302: GENERATE VEHICLE ASSIGNMENT SCENARIOS, a set of assignment scenarios are generated based on dynamic, predicted and real-time data. The vehicle assignment scenarios are solutions that could be implemented in the assignment of vehicles to the pool of customers in the forecast. It should be appreciated that a variety of rules, heuristics, algorithms, etc. may be employed in generating the assignment scenarios. In some embodiments, a brute force technique may be employed to generate all possible scenarios. In such an embodiment, an exhaustive set of scenarios may be generated based on the customers identified in the forecast and the availability of vehicles in the fleet and the anticipated swaps. For instance, if there are k customers and n available vehicles, a brute force exhaustive scenario generator would produce $n!/(k!(n-k)!$ scenarios. As an example, if the forecast includes 10 customers and there are 30 vehicles to choose from, then the number of scenarios would be $30!/10!(30-10)!$, or 30,045,015 scenarios. Obviously, this would be a cumbersome task and require significant memory and processing power but, given today's advances in technology, it could easily be implemented.

However, various embodiments may apply a wide variety of rules, filters, algorithms, heuristics, etc. to cull the number of scenarios down. It should be obvious that in selecting the optimal scenario, certain scenarios could be easily filtered out based on a variety of information. For instance, if a particular customer is a great distance from the location of a particular vehicle such that it would make the delivery of the vehicle expensive, any scenarios that would include such a combination could easily be eliminated. Likewise, scenarios that would result in assigning a vehicle that would have a customer satisfaction rating that falls below a particular threshold could also be eliminated. In some embodiments, the SVS may identify a group of vehicles that meet the needs/demands of each customer, if possible. Based on this information, scenarios generated may be limited to scenarios in which customers are only assigned vehicles from the identified groups. For instance, as an expansion of the above-provided non-limiting example in which 10 customers are on the forecast list with 30 available vehicles, if each customer had a group of 5 vehicles identified, then the scenario generation would be reduced as follows: 5!/(5−1)!**10 or 9,765,625 potential scenarios (the number of scenarios would be reduced based on overlap of vehicles in the groupings for various customers). In addition, certain pairings could be eliminated from the generated scenarios. For instance, if Vehicle A is more than a threshold distance from a subset of the customers, then those pairings may not be considered for any scenario. Similarly, if the timing of availability of the vehicles do not fall within a threshold period of time, the vehicles may be eliminated from the scenario generation.

Further, a filter may be applied to remove vehicles that are within a threshold period of time of requiring maintenance. In addition, in a system that may include multiple instances of the various states, the information presented in one forecast may be used to limit the scenario generations in another forecast. For example, suppose that a forecast generated at time t+1 includes a customer vehicle swap request for a particular vehicle that would result in a very high satisfaction scoring. The SVS determines that that particular vehicle is being presented in the forecast generated at time t. The SVS may withdraw that particular vehicle from the availability list for forecast(t) and reserved it for scenario generations for forecast(t+1). Similarly, if it is determined that the particular vehicle is of no interest to any of the customers in forecast(t), then the vehicle could be removed from the domain of available vehicles for scenario generation.

It should be appreciated that a variety of other filters may be applied to reduce to complexity of the scenario generation and the filters presented here are only a few non-limiting examples. As mentioned previously, the suggestion generation of the above-referenced patent application with the title of LEARNING AGENT FOR GENERATING AND AUGMENTING DATA IN A SUBSCRIPTION VEHICLE SERVICE SYSTEM BY DYNAMICALLY GENERATING REQUESTS AND PROCESSING RESPONSES can be used to generate list of vehicle suggestions for each customer in the forecast to limit the number of scenarios generated. Thus, for each customer in the pool or the forecast, the types of vehicles that meet expected needs/demands can be identified. Further, groups of vehicles and/or specific vehicles for each customer in the pool may be identified and then analyzed to identify the parametric fit of each type, group or specific vehicle for each customer. Once the assets are thus analyzed, they can be sorted based on fit, then sorted based on availability and then sorted based on location of vehicle. The list can then be culled to only include the top n choices and thus, used to filter the available vehicle fleet in generating the scenarios.

Once the vehicle assignment scenarios are generated, the processing state moves to state 303: IDENTIFY BEST SCENARIO. In this state, the scenarios generated in state 302 based on the forecast generated in state 301 can be analyzed to identify one or more optimal scenarios to be used in the final vehicle assignment. Each of the scenarios can be analyzed based on various factors and be assigned scores, weighted points, etc. for one or more categories. Once each of the scenarios is thus analyzed, they can then be ranked or sorted based on the values associated with the various one or more categories. For instance, in one embodiment each scenarios may receive a score for the expected customer satisfaction or experience for the scenario, the revenue to be generated or cost implications for the scenario and the optimization of vehicle assignments. The scores may be calculated in a variety of manners for each of these, as well as other categories. For instance, the expected customer satisfaction score may be based on the number or percentage of customers that are expected to have a satisfaction score above a particular threshold. For instance, if 80% of the customers are expected to have a satisfaction level at or above a particular threshold, the score for this category could be 80. Similarly, the score may be based on the number of customers expected to have a satisfaction score below a minimal threshold. The score could also be an average of the expected customer satisfaction scores, the mean of the expected customer satisfaction scores, etc.

The revenue generated for a particular scenario can be expressed in absolute numbers or in relative numbers, such as deltas from a desired performance level. The revenue generated for the various scenarios can fluctuate based on a variety of factors. For instance, if incentives are offered to some customers to increase their customer satisfaction for sub-optimal vehicle selections, the revenue may decrease. However, if some customers are upsold on upgraded vehicles, then the revenue may increase. In addition, an expected revenue amount may be assumed for each flip but, a given flip may end up running above or below the expected amount. Thus, each of the scenarios can be given a score based on the amount of revenue they generate or the cost they impose to the service provider.

The vehicle optimization of a scenario may also be considered. For instance, scenarios that result in retaining vehicles for which maintenance is due but fielding the rest may be given a high ranking, while scenarios that result in several vehicles remaining in the warehouse that do not require servicing may be given a lower ranking.

Another metric that could be used in analyzing the scenarios is the consideration of other variables, such as the locations of vehicles and the complexity of the flips, the amount of preparation of a vehicle and the travel time to perform a flip, as well as constraints to flip sequencing. Other variables could also be considered but, these variables are examined as non-limiting examples.

As previously described, the cost implications of a scenario may be considered and, the costs associated with flips are one such implication. However, many other metrics are also associated with flips and they may be used as input for ranking the various scenarios. For instance, the location of vehicles and the logistics of the flips may be considered. Each flip may be ranked by the distance between the two vehicles and then the overall scenario can be ranked based on the cumulative distance, the average distance, the mean distance, etc. Further, the flips may be ranked also based on the amount of preparation or maintenance that is required as well as the travel time to conduct the flip. For instance, if a particular vehicle that is being flipped to another customer was damaged or had excessive wear or soiling by the previous customer, the vehicle may be subject to significant preparation time to get it ready for the flip. In addition, the employees that are performing the flip may have to travel a significant distance in taking flip vehicles to a customer.

Further, scenarios may be ranked based on the efficiency of implementing the required flips. If a particular scenario results in a long sequence of dependent flips, the amount of time required to implement the scenario may result in the scenario being undesirable. In addition, sequencing of flips may result in the service providing having idle employees. If multiple flips are dependent upon previous flips, then they may be required to be performed in a linear fashion. As such, employees may be wasted resources in such scenarios and those scenarios may be ranked lower than other scenarios.

Even further, scenarios may be evaluated simply by the number of flips required. Thus, scenarios that have a minimal number of flips may be ranked higher than scenarios that include a larger number of flips. In addition, some flips for some customers may be easier to perform than other flips. Thus, if a customer typically does not show up for a flip, frequently reschedules flips or even cancels them, the presence of such customers in a scenario may be used to lower the desirability of the scenario.

Thus, applying these actions, as well as others that will be apparent to those of ordinary skill in the art, can result in creating various rankings of the scenarios, either as a whole or categorically. The scenarios can then be sorted based on the ranking values and one or more of the categories. Further, some categories may be determined to be more important than other categories. For instance, customer satisfaction may be considered to be more important than the total amount of expected time to implement a scenario. The SVS can then select one or more scenarios based on the desired characteristics of the scenarios.

When one or more scenarios have been selected, the state machine can transition to state 304: OPTIMIZE SCENARIO. In this state, the one or more scenarios selected as the best-fit scenarios can be analyzed to determine if they can be improved or optimized. One of the techniques that can be employed to optimize scenarios is to interact with the customers through the provision of customer prompts that can iteratively improve the initial scenario. One such interaction may be implemented upon identifying one or more gaps in the expected customer experience or "fit" scores. For instance, if a particular scenario has one or more vehicle assignments that will result in a poor expected customer satisfaction score, that particular assignment may be examined to determine if there is a better fit in the fleet or already allocated that could be subjected to a solicited flip. Taking measures to alleviate these gaps can thus improve the overall score or ranking of a scenario. As an example, the SVS may identify a vehicle that would provide a better fit to Customer A and so, the current customer in the possession of such vehicle can be approached to ascertain his or her willingness to enter a flip.

Various embodiments may operate to normalize gaps in the scenarios by providing incentives to increase customer satisfaction in vehicle assignments. Thus, if a particular flip in a scenario has a low expected customer satisfaction, incentives can be offered to the customer to increase the expected customer satisfaction. In addition, gaps may be normalized by obtaining additional assets for the fleet. As an example, if a particular vehicle continues to be identified as highly desired or mandatory, the fleet can be expanded by including additional instances of such vehicle. If it is anticipated or has been demonstrated in the past that such demand is seasonal, cyclical or temporary, the fleet can be expanded by renting the additional asset or leasing the additional asset. Thus, the fleet can be temporarily expanded to satisfy certain blips or anomalies in the demand.

In addition, similar to techniques that are presented in the above-incorporated US patent application with the title of LEARNING AGENT FOR GENERATING AND AUGMENTING DATA IN A SUBSCRIPTION VEHICLE SERVICE SYSTEM BY DYNAMICALLY GENERATING REQUESTS AND PROCESSING RESPONSES, as well as the above-reference US patent application having the title SYSTEM AND METHOD FOR GENERATING OPTIMAL VEHICLE SUGGESTIONS BY DYNAMICALLY OBTAINING AND EVALUATING INFORMATION for contacting and soliciting information from a customer may be employed while the SVS is in state 304. Thus, if certain categories of a particular scenario have a low score but other categories have a high score, customers in the forecast list, as well as customers that could agree to a flip that would help improve the value of a scenario, may be contacted through various prompts. For instance, if a particular customer has a vehicle that would greatly increase the satisfaction index for Customer A, the SVS may generate a series of prompts to engage Customer A in a conversation designed to gather information that can be used to persuade Customer A to agree to a flip and, would result in improving the customer satisfaction score associated with Customer A as well as the particular customer that would be receiving the desired vehicle.

In some situations, customer may be given upgrade incentives to promote or entice them to agree to a flip. The incentives may be offered based on vehicle availability, intensity of vehicle need and/or propensity of the customer to respond to such prompts. For instance, a single customer may be happy to flip to any selected vehicle in exchange for having his or her cost for the subscription service reduced. Such customers can be earmarked as generally available for a flip and thus, can be considered as "go to" sources for optimizing the various scenarios. It should be clear that the optimization of the scenarios needs to be accomplished relatively quickly so that the final optimized scenario can be selected and implemented. Thus, customers that have a propensity to ignore flip prompts may not be approached. Further, some customers may have a heightened intensity in their desire for a particular vehicle. Regardless of the reason for such heightened intensity, incentives or upgrades may be provided to other customers to facilitate fulfillment of the intensity.

After the scenarios have been optimized, a final scenario must be selected and implemented. This occurs when the system transitions to state 305: IMPLEMENT SCENARIO. In this state, the employees and agents of the service provider begin to implement the flips as presented in the selected scenario. Various tools and techniques can be applied in identifying the sequencing of the flips and the assignment to employees in performing the flips. It should be understood that the analysis of how to implement a particular scenario can also be a contributing factor in optimizing the desirability of the particular scenario. For instance, in analyzing the implementation plan, it may be discovered that a particular scenario will result in utilizing each available employee for a minimal amount of time in performing the flips. Such information may improve the overall ranking of the given scenario.

The described system and method presented as a state machine that can be implemented entirely within a computing system and a distributed networked based computing system thus, applies heuristics, logic, rules, algorithms, etc. to identify and implement and optimized assignment of vehicles to a pool of customers subscribing to an SVS.

Once the scenario is implemented, as illustrated in FIG. 1, the state 301: GENERATE INITIAL FORECAST can be reentered to start the process all over again. In addition, as previously mentioned, several concurrent threads may be implemented at the same time and such threads may exist in different states as illustrated in FIG. 1.

Figure 2:
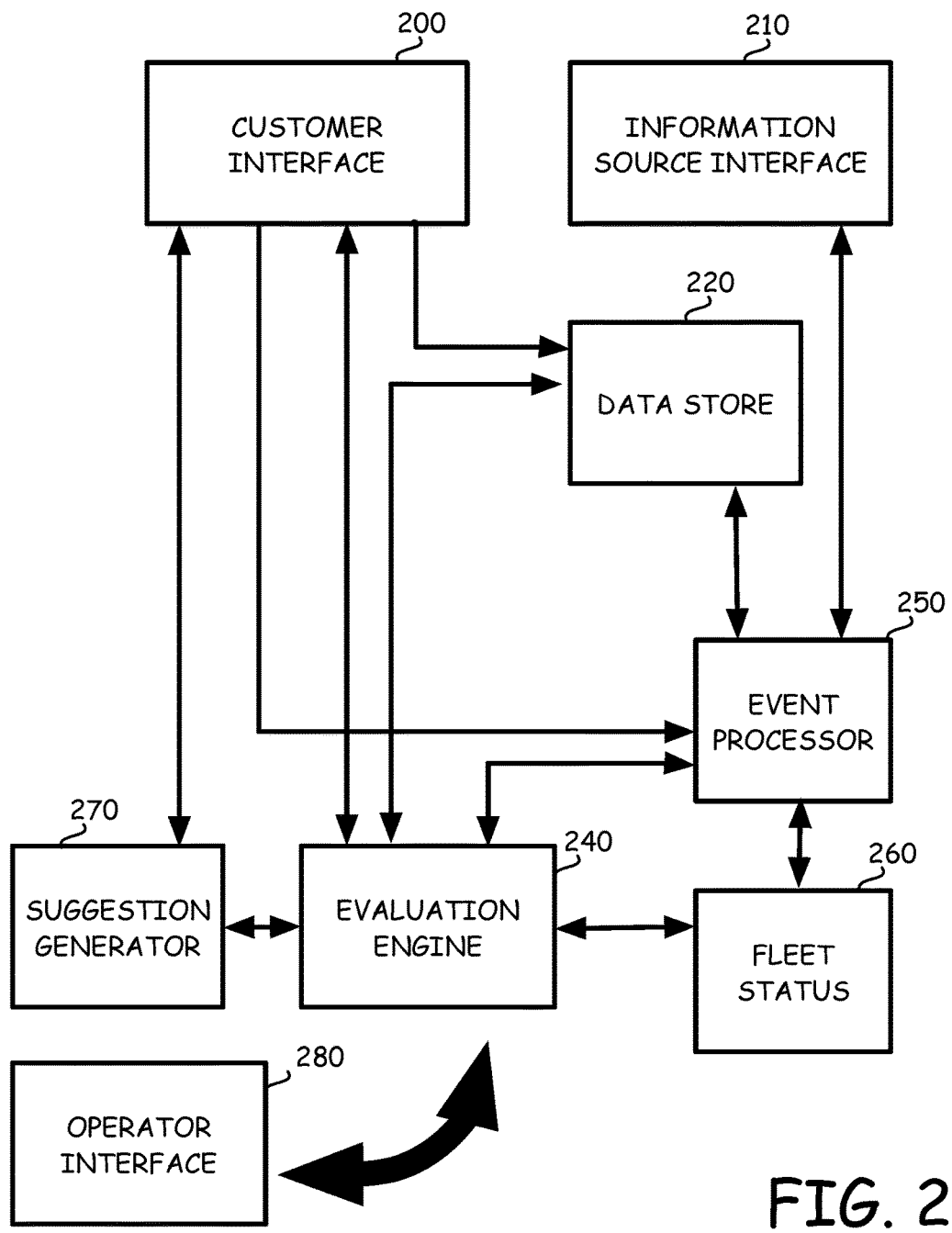
FIG. 2 is a block diagram illustrating functional operations of an exemplary embodiment of the SVS.

FIG. 2 is a block diagram illustrating functional operations of an exemplary embodiment of an SVS that can include the various embodiments presented in this disclosure. It should be appreciated that the particular breakdown of the various functional blocks is only provided for an overall functional understanding of an exemplary embodiment and is not intended to illustrate an actual structural or architectural restriction on various implementations. For instance, the functionality in one illustrated block may actually be performed or implemented by multiple systems that are geographically dispersed, multiple modules in the same computing system, or multiple software flows in the same executable software element. In addition, functionality that is illustrated in separate blocks may actually be incorporated into the same software or hardware module. Thus, those skilled in the art will appreciate that the presented structure is simply provided to assist in the understanding of the overall functionality of an exemplary embodiment.

The functional block diagram illustrates a customer interface 200 and an information source interface 210. The customer interface 200 enables the SVS to interact with a customer that is registering to utilize the SVS, providing initial information for the creation of the customer and account profile, present vehicle suggestions from the SVS, as well as receive and respond to requests for additional information, provide feedback to the system and interact with the SVS for requesting vehicles and vehicle swaps, as well as a variety of other functionality as is presented in the above-incorporated applications.

The data store 220 is utilized as a database or storage medium for information that is acquired and/or utilized by the SVS. For instance, the initial profile information received through the customer interface 200, as well a augmentations thereto can be stored within the data store 220.

The information source interface 210 enables the SVS to interact with external systems, databases or other sources of information to further gather and/or augment the profile information and to obtain other information that can be utilized in the generation of metrics, evaluation of vehicle requests and other events and the generation of vehicle suggestions.

The event processor 250 operates to receive and interpret various events that may be received by or occur in the SVS. The event processor 250 may receive events directly from the customer interface 200, such as a vehicle flip or swap request, feedback, queries regarding vehicle availability, etc. In addition, the event processor may receive events that are triggered by the evaluation engine 240, the fleet status 260, the information source interface 210 or any other source or generator of an event in the SVS that needs to be processed. If an event received by the event processor 250 is a request for a vehicle or a vehicle swap, the event processor 250 can operate to trigger the evaluation engine 240 to generate a vehicle suggestion list that can be used in generating the forecast. If the evaluation engine 240 determines that additional information is required or that additional information may be useful to generate a more optimum vehicle suggestion list, the evaluation engine 240 may trigger a campaign event for obtaining such further information by invoking such an event.

The operator interface 280 may include a terminal access to the SVS, Internet access, mobile access through a browser or a resident app, messaging, etc. Through the operator interface 280, one or more operators can interact with most elements or functional capabilities of the SVS to provide further input or control. For example, the operator can directly interact with a customer by the operator interface 280 providing direct access to the customer through the customer interface 200. Such access could be in the form of messaging, push notifications, chatting, etc. Through the operator interface 280, the operator may also be able to review the information available in the data store 220, directly trigger events for the event processor 250, review/modify/reject vehicle suggestions from the suggestion generator 270, enable/disable/modify the various heuristics/algorithms of the evaluation engine 240, etc.

The evaluation engine 240 primarily performs the functions required in each state as illustrated in FIG. 1. Thus, the evaluation engine generates the forecast, identifies the available vehicles and generates the vehicle assignment scenarios, scores the scenarios and selects the optimal scenario. Finally the evaluation engine 240 initiates actions to improve or optimize the scenarios and then generates the information used by system operators and employees to implement the selected optimal scenario.

Figure 3:
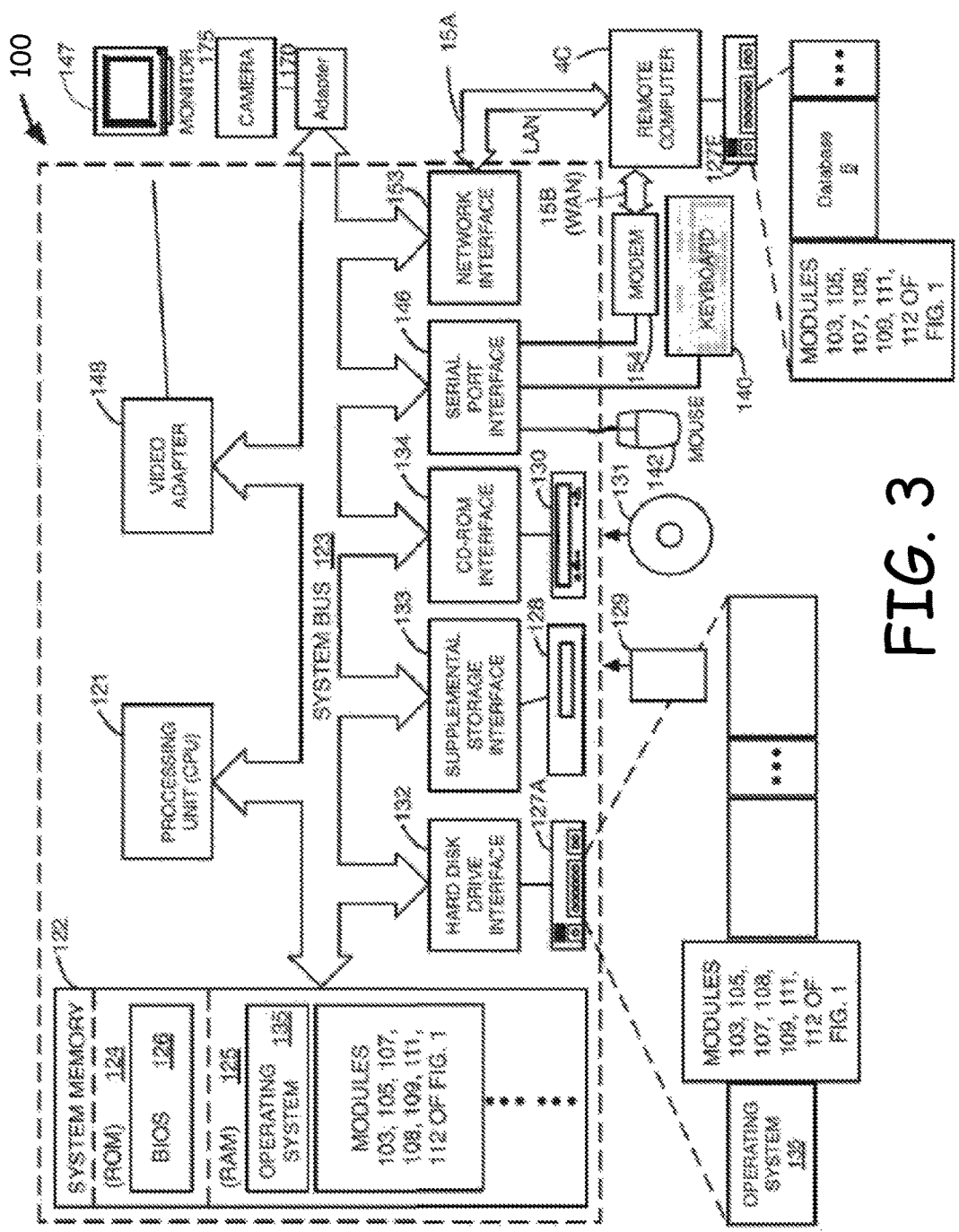
FIG. 3 is a functional block diagram of one exemplary embodiment of a computing system that may form one of the system components of the SVS.

FIG. 3 is a functional block diagram of one exemplary embodiment of a computing system that may form one of the system components of the SVS. The illustrated system, as well as each of the components may be a physical machine in a physical environment or a virtual machine instance running in a virtual private cloud provided by a commercial cloud-computing provider, associated with any component of the system of the present disclosure. One of ordinary skill in the art understands that the written description associated with FIG. 3 may be applicable to any system component described as running system content, applications, tiers, programs, process flows, methods, etc. For example, one of ordinary skill in the art will recognize that the SVS in combination with the computing system of FIG. 2 may support a virtualized environment. That is, the SVS may execute the software of this disclosure in a virtualized environment where a virtual machine is running on a hypervisor that is supported across a number of physical machines. However, other configurations besides the virtualized environment are possible and are included within the scope of this disclosure.

Referring again to FIG. 2, the computing system, or server 100, may comprise a processing unit 121, a system memory 122, and a system bus 123 that couples various system components including the system memory 122 to the processing unit 121. The system bus 123 may comprise any of several types of bus structures including a memory bus or memory controller, a peripheral bus, and a local bus using any of a variety of bus architectures. The system memory may comprises a read-only memory (ROM) 124 and a random access memory (RAM) 125. A basic input/output system (BIOS) 126, containing the basic routines that help to transfer information between elements within computer 120, such as during start-up, is stored in ROM 124.

The server 100 may comprise a hard disk drive 127A for reading from and writing to a hard disk, not shown, a supplemental storage drive for reading from or writing to a removable supplemental storage 129 (like flash memory and/or a USB drive) and an optical disk drive 130 for reading from or writing to a removable optical disk 131 such as a CD-ROM or other optical media. Hard disk drive 127A, magnetic disk drive 128, and optical disk drive 130 are illustrated as being connected to system bus 123 by a hard disk drive interface 132, a supplemental storage drive interface 133, and an optical disk drive interface 134, respectively.

Although the exemplary environment described herein is illustrated as employing hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet-connected devices such as in a portable devices and/or personal digital assistants (PDAs).

The drives and their associated computer readable media provide nonvolatile storage of computer-executable instructions, data structures, program modules, and other data for computer or client devices. A number of program modules may be stored on hard disk 127, magnetic disk 129, optical disk 131, ROM 124, or RAM 125, including, but not limited to, an operating system 135 as well as various modules and routines as presented in FIG. 2, as well as the various heuristics, algorithms and data. Program modules comprise routines, sub-routines, programs, extendable objects, components, data structures, etc., which perform particular tasks or implement particular abstract data types. Aspects of the present invention may be implemented in the form of a downloadable, client-side, application modules, which are executed by server 100 in order to provide the functionality described herein.

A user may enter commands and information into server 100 through input devices, such as a keyboard 140 and a pointing device 142. Pointing devices may comprise a mouse, a trackball, and an electronic pen that may be used in conjunction with an electronic tablet. Other input devices (not shown) may comprise a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), wireless interface such as WIFI or BlueTooth, or the like. Likewise, the user can enter commands through a browser type interface running on a separate computer, laptop, hand-held device, etc., that connects to the server 100 through a LAN 15A, WAN 15B or other interface.

The display monitor 147 may also be connected to system bus 123 via an interface, such as a video adapter 148. The display 147 may comprise any type of display devices such as a liquid crystal display (LCD), a plasma display, an organic light-emitting diode (OLEO) display, and a cathode ray tube (CRT) display.

A camera 175 may also be connected to system bus 123 via an interface, such as an adapter 170. The camera 175 may comprise a video camera such as a webcam. The camera 175 may comprise a CCD (charge-coupled device) camera or a CMOS (complementary metal-oxide-semiconductor) camera. In addition to the monitor 147 and camera 175, other peripheral output devices (not shown), such as speakers and printers may also be communicatively coupled to the server 100.

Server 100 may operate in a networked environment using logical connections to one or more remote computers, such as a web server. A remote computer may comprise another personal computer, such as another server 4C, a portable computing device, a router, a network PC, a peer device, or other common network devices. While the web server 4C or a remote computer typically comprises many or all of the elements described above relative to the server 100, only a memory storage device 127E has been illustrated in FIG. 3. The logical connections depicted in FIG. 3 comprise a local area network (LAN) 15A and a wide area network (WAN) 158. Such networking environments are commonplace in offices, enterprise wide computer networks, intranets, and the Internet.

When used in a LAN networking environment, server 100 is often connected to the local area network 15A through a network interface or adapter 153. When used in a WAN networking environment, server 100 typically comprises a modem 154 or other means for establishing communications over WAN 158, such as the Internet. Modem 154, which may be internal or external, is connected to system bus 123 via serial port interface 146. In a networked environment, program modules depicted relative to the server 4C, or portions thereof, may be stored in the remote memory storage device 127E. It will be appreciated that the network connections shown are exemplary and other means of establishing a communications link between server 100 and other devices may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network (such as communications-network 15A, for example). In a distributed computing environment, program modules may be located in both local and remote memory storage devices.

In one exemplary embodiment, one or more extendable objects, applications, programs, system processes, method steps, etc. of the system of the present disclosure may be stored in the memory 112 as computer program instructions. In one exemplary embodiment related to the functional diagram of FIG. 1, the server 100 may execute, at least partially, one or more of the functional modules, routines, etc. to perform the actions presented for each state.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for a computer system to optimize the assignment of vehicles within a fleet of vehicles, across a pool of multiple users, the method comprising:

a server accessing network accessible data pertaining to the pool of multiple users in the process of generating a forecast, wherein the forecast is created to include information that identifies a plurality of customers, wherein each of the plurality of customers are users from the pool of multiple users that have requested a vehicle, and the vehicle needs for each of the plurality of customers;

maintaining a fleet of vehicles available to be assigned to customers within the pool of multiple users and installing telematics devices in each of the vehicles of the fleet of vehicles;

for each particular customer of the plurality of customers, the server receiving data over a network, wherein the data is generated by one or more of the telematics devices within a vehicle asset associated with the particular customer of the plurality of customers;

for each particular customer of the plurality of customers in the forecast, the server examining a fleet inventory list maintained on the server to create a group of available vehicles that coincide with the vehicle needs of the particular customer as presented in the forecast and that coincides with the received data for that particular customer;

the server applying heuristics to cull the group of available vehicles for each customer by:
  (a) removing vehicles that are outside of a threshold distance from the particular customer, and
  (b) removing vehicles that do not have an availability within a threshold period of time;

the server generating a plurality of vehicle assignment scenarios based at least in part on the customers identified in the forecast and the culled group of available vehicles for each particular customer, wherein each of the one or more sets of vehicle assignment scenarios includes a pairing of each particular customer in the plurality of customers and a vehicle selected from the culled group of available vehicles for each particular customer;

the server calculating a value that is the expected revenue to be generated for each of the plurality of vehicle assignment scenarios less the cost associated with the implementation of each of the plurality of vehicle assignment scenarios;

the server assigning a score to each of the plurality of vehicle assignment scenarios based on the calculated value;

the server selecting one or more vehicle assignment scenarios based on the score assigned to the vehicle assignment scenarios;

the server optimizing the selected vehicle assignment scenarios by:
  identifying particular vehicle to customer assignments in the selected vehicle assignment scenarios that have a customer satisfaction score below a threshold value; and
  modifying the particular assignment to obtain a higher customer satisfaction score or identify one or more incentives to offer the customer associated with the particular vehicle to customer assignment to increase the satisfaction score; and the server selecting an optimal vehicle assignment scenario by selecting the vehicle assignment scenario in which the sum of the customer satisfaction scores for each of the customer vehicle assignment pairs in the vehicle assignment scenario is maximized;

the server generating a vehicle assignment scenario report to provide to system operators for implementing the selected optimal vehicle assignment scenario to deliver and recover vehicles between the pool of multiple users.

2. The method of claim 1, wherein the action of generating a forecast of customer vehicle needs comprises the server identifying customers that have requested a flip.

3. The method of claim 2, wherein the action of generating a forecast of customer vehicle needs further comprises the server identifying customers that are expected to request a flip in the near future.

4. The method of claim 2, wherein the action of generating a forecast of customer vehicle needs further comprises the server identifying customers that possess vehicles that are desired by other customers.

5. The method of claim 2, wherein the action of generating a forecast of customer vehicle needs further comprises the server identifying customers that possess vehicles for which the assignments are near expiration.

6. The method of claim 1, wherein the action of generating a plurality of vehicle assignment scenarios based at least in part on the customers identified in the forecast and the culled group of available vehicles for each particular customer comprises the server filtering available vehicles that are within a threshold period of time of requiring maintenance.

7. The method of claim 1, wherein the action of generating a plurality of vehicle assignment scenarios based at least in part on the customers identified in the forecast and the culled group of available vehicles for each particular customer comprises the server filtering available vehicles that are identified in other forecasts.

8. A system to optimize the assignment of vehicles across a pool of multiple users, the system comprising:
a processing unit configured to interface to a system memory and a system bus that communicatively couples the processing unit to a customer interface and an information source interface for obtaining information to generate a forecast, wherein the forecast is created to include information that identifies a plurality of customers that request a vehicle and the vehicle needs for each of the plurality of customers;
a plurality of vehicles, wherein each of the plurality of vehicles includes a telematics device installed therein for transmitting telematics data, including vehicle location data, toward the information source interface and, the processing unit is further configured to receive, for each particular customer of the plurality of customers, data generated by a particular telematic devices within a particular vehicle of the plurality of vehicles that is associated with the particular customer of the plurality of customers and to include the received data in the vehicle needs for that particular customer;
for each particular customer of the plurality of customers in the forecast, the processing unit being configured to examine a fleet inventory list maintained on the server to identify a group of available vehicles from the plurality of vehicles that coincide with the vehicle needs of the particular customer and that are within a threshold distance from the particular customer as presented in the forecast;
the processing unit communicatively coupled to a fleet status identifying a group vehicles in the fleet that are available and further configured to apply heuristics to cull the group of available vehicles for each customer by: (a) removing vehicles that are outside of a threshold distance from the particular customer, and (b) removing vehicles that do not have an availability within a threshold period of time;
the processing unit configured to generate a plurality of vehicle assignment scenarios based at least in part on the customers identified in the generated forecast and the culled group of available vehicles; wherein each of the plurality of vehicle assignment scenarios includes a pairing of each particular customer in the pool of customers and a vehicle selected from the culled group of available vehicles for each particular customer;
the processing unit further configured to score the vehicle assignment scenarios, wherein the score is based on the expected revenue to be generated for each vehicle assignment scenario less the cost associated with the implementation of each vehicle assignment scenario, and selecting one or more vehicle assignment scenarios based on the score attributed to the vehicle assignment scenarios;
the processing unit further configured to optimize the selected vehicle assignment scenarios by identifying modifications that can improve the score of one or more of the selected vehicle assignment scenarios; and
the processing unit further configured to generate a vehicle assignment scenario report to provide to system operators for selecting and implementing the optimal vehicle assignment scenario.

9. The system of claim 8, wherein the processing unit is configured to generate a forecast of customer vehicle needs by identifying customers that have requested a flip.

10. The system of claim 8, wherein the processing unit is configured to generate a forecast of customer vehicle needs by identifying customers that have requested a flip and identifying customers that are expected to request a flip in the near future.

11. The system of claim 8, wherein the processing unit is configured to generate a forecast of customer vehicle needs by identifying customers that have requested a flip and identifying customers that are expected to request a flip in the near future and identifying customers that possess vehicles that are desired by other customers.

12. The system of claim 8, wherein the processing unit is configured to generate a forecast of customer vehicle needs by identifying customers that have requested a flip and identifying customers that are expected to request a flip in the near future and identifying customers that possess vehicles for which the assignments are near expiration.

* * * * *